United States Patent [19]

Chappell et al.

[11] 4,192,137

[45] Mar. 11, 1980

[54] TURBOSHAFT ENGINE

[75] Inventors: Marcus S. Chappell, Ottawa; Douglas A. J. Millar, Winchester, both of Canada

[73] Assignee: Canadian Patents and Development Limited, Ottawa, Canada

[21] Appl. No.: 935,118

[22] Filed: Aug. 21, 1978

Related U.S. Application Data

[63] Continuation-in-part of Ser. No. 774,280, Mar. 4, 1977, abandoned.

[51] Int. Cl.² ............................................. F02C 3/10
[52] U.S. Cl. ........................... 60/39.16 R; 60/39.16 C; 415/65
[58] Field of Search ................... 60/39.16 R, 39.16 C; 415/60, 65, 68, 69

[56] References Cited

U.S. PATENT DOCUMENTS

| 3,363,831 | 1/1968 | Garnier | 415/65 |
| 3,703,081 | 11/1972 | Krebs et al. | 415/65 |

FOREIGN PATENT DOCUMENTS 587528  11/1977  United Kingdom ............... 60/39.16 C

*Primary Examiner*—Louis J. Casaregola
*Attorney, Agent, or Firm*—Ronald G. Bitner

[57] ABSTRACT

An improvement in torque characteristics is provided for a turboshaft engine of the type having a compressor rotor driven by a gas generator turbine that is mechanically independent of the power turbine. The improvement comprises a rotatable compressor stator casing which is interconnected with the power turbine rotor to allow rotation of the compressor casing in the same direction as the compressor rotor at a lower speed. At reduced output shaft speed, the relative speed between the compressor rotor blades and stator blades is increased for increased gas generator output and hence torque, for a predetermined compressor rotor speed.

1 Claim, 5 Drawing Figures

TURBOSHAFT ENGINE

CROSS REFERENCE TO RELATED APPLICATION

This application is a continuation-in-part of application Ser. No. 774,280, filed Mar. 4, 1977, now abandoned.

BACKGROUND OF THE INVENTION

This invention relates to a turboshaft gas turbine engine.

For many applications of turboshaft engines, it is desirable that available engine torque increase as output shaft speed decreases. This effect is obtainable to some extent with present free-power-turbine engines which provide about 200% of design-point torque when the output shaft is stationary. However, it is desirable that torque be multiplied still further to more nearly match the power unit to its load with minimal intervening means such as gearing or torque converter.

British Pat. No. 587,528 to Power Jets Limited and A. R. Howell, proposes a turbine power plant which includes the use of rotatable stator elements. The stated chief object is to provide for taking off power at low rotational speeds. However, the torque multiplication that the disclosed embodiments provide at less than design speed conditions is less than that of conventional free-power-turbine engines.

SUMMARY OF THE INVENTION

An object of the present invention is to enhance the increase of torque of a turboshaft engine as the output shaft speed is decreased.

Another object is to provide increased torque without increase in gas generator rotor speed.

Another object is to provide an increase in gas generator output without an increase in the speed of the gas generator rotor.

Another object is to provide a gas turbine engine in which the mechanically independent gas generator turbine contributes power to the output shaft.

Another object is to allow flexibility of design by permitting distribution of output load between the power turbine and gas generator turbine.

The present invention provides an improved turboshaft engine comprising a compressor having a rotor and stator casing, a gas generator turbine having a rotor and fixed stator, a power turbine having a rotor and a fixed stator, and an output shaft connected with the power turbine rotor; said compressor rotor being connected with the gas generator turbine rotor; and said compressor stator casing being rotatably mounted and coaxial with the compresor compressor rotor and interconnected with the output shaft for allowing rotation of the compressor casing in the direction of the compressor rotor at a speed less than that of the compressor rotor and in proportion to the output shaft speed.

DESCRIPTION OF THE PREFERRED EMBODIMENTS

Figure 1:
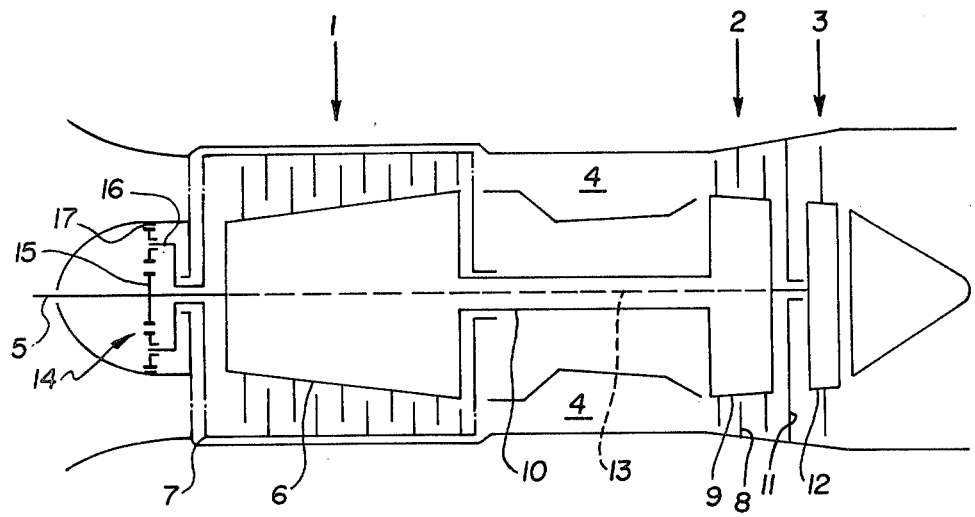
FIG. 1 is a schematic illustration of a turboshaft gas turbine engine in accordance with the present invention.

With reference to FIG. 1, the turboshaft engine of the present invention includes a compressor 1, a gas generator turbine 2, a power turbine 3, a combustor 4 and an output shaft 5. The compressor 1 has a rotor 6 and a rotatably mounted stator casing 7 that is coaxial with the compressor rotor 6. The gas generator turbine 2 has a fixed stator 8, and a rotor 9 that is connected with the compressor rotor 6 by a shaft 10. The power turbine 3 has a fixed stator 11, and a rotor 12 that is interconnected with the compressor stator 7 by means of the shaft 13 and planetary gear set 14. The output shaft 5 is connected with the shaft 13.

In the planetary gear set 14, the power turbine rotor 12 is interconnected with the sun gear 15 by means of the shaft 13, the compressor stator casing 7 is connected with the pinion carrier 16, and the ring gear 17 is fixed.

The gearing 14 is such that the compressor casing 7 rotates at a predetermined ratio with the shafts 5 and 13 and in the same direction as the compressor rotor 6 but at a reduced speed. The gearing ratio is selected so that the compressor casing rotates at a speed less than that of the compressor rotor under any speed conditions of the output shaft or gas generator rotor.

In operation, the compressor rotor 6 is driven by the turbine rotor 9 and is governed to run at predetermined conditions such as constant speed or constant turbine temperature in a conventional manner. At design conditions the power turbine rotor 12 will be rotating at design (100%) speed and the compressor casing 7 will be rotating in the direction of the compressor rotor 6 but at a lesser speed, so that the relative speed between the compressor rotor blades and stator blades will be less than the compressor rotor speed. Under conditions of increased loading the speed of the power turbine will be reduced. At the same time the speed of the compressor casing will be reduced proportionally. Since the compressor casing rotates in the direction of the compressor rotor, the reduction of casing speed results in an increase in relative or aerodynamic speed of the compressor, thereby increasing gas generator output and providing increased torque and power. Maximum torque will normally be achieved when the output shaft 5 is stationary, since under such conditions the stator casing will also be stationary and the relative compressor speed will be maximum.

It should be noted a reduction of the speed of the output shaft 5 and/or power turbine rotor 12 does not in itself significantly affect the gas generator operating conditions. In turboshaft engines of the present type, flow through the power turbine is normally choked and therefore the flow velocity as seen by the gas generator turbine remains constant, and since with the present invention, the turbine stators are fixed, the direction of flow also remains constant. As a result the gas generator turbine is essentially independent, both aerodynamically and mechanically, of the power turbine.

The present invention allows the gas generator turbine to contribute torque and power to the output shaft without a direct mechanical connection. As the compressor rotor 6 rotates, it exerts a torque on the compressor casing 7 which is transferred to the output shaft by means of the interconnected gearing 14. The ability to distribute load between the power turbine and gas generator turbine provides greater flexibility of design.

Figure 2:
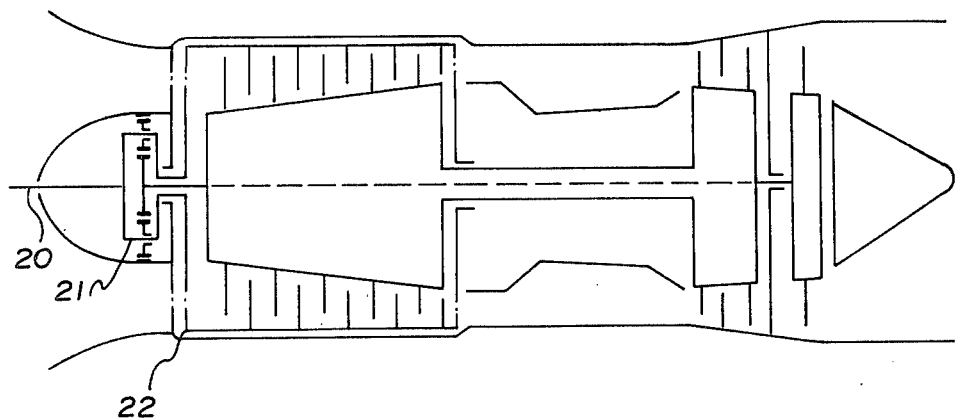
FIGS. 2 to 4 are schematic illustrations of other embodiments of the present invention incorporating various gearing configurations.

In FIG. 1, the output shaft 5 is shown connected directly with the power turbine rotor 12. However, for most applications, the high turbine speed must be reduced. Referring to FIG. 2, speed reduction can conveniently be achieved by interconnecting the output shaft 20 with the pinion carrier 21. With this arrangement, the output shaft speed will be equal to the speed of the compressor casing 22. In other respects the operation is identical to that shown in FIG. 1.

Figure 3:
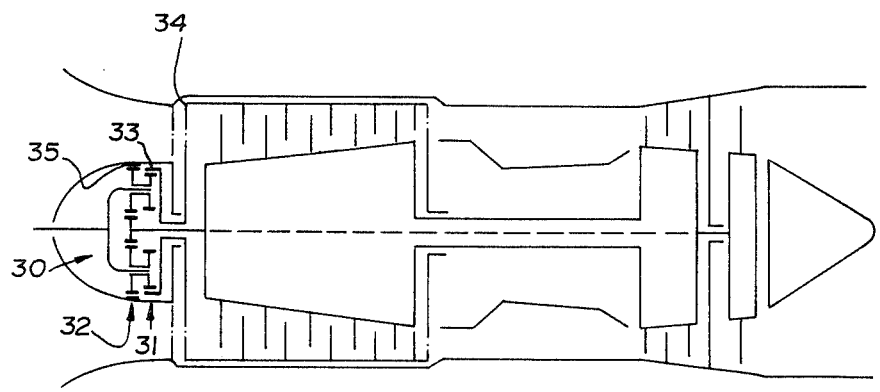

FIG. 3 illustrates another gearing arrangement which allows the output shaft speed to be chosen independently of the compressor casing speed and power turbine speed. Referring to FIG. 3, the gearing 30 comprises two planetary sets 31 and 32 incorporating a single sun gear and two ring gears engaging dual planet gears. The ring gear 33 of planet set 31 is interconnected with the compressor casing 34 while ring gear 35 is fixed.

Figure 4:
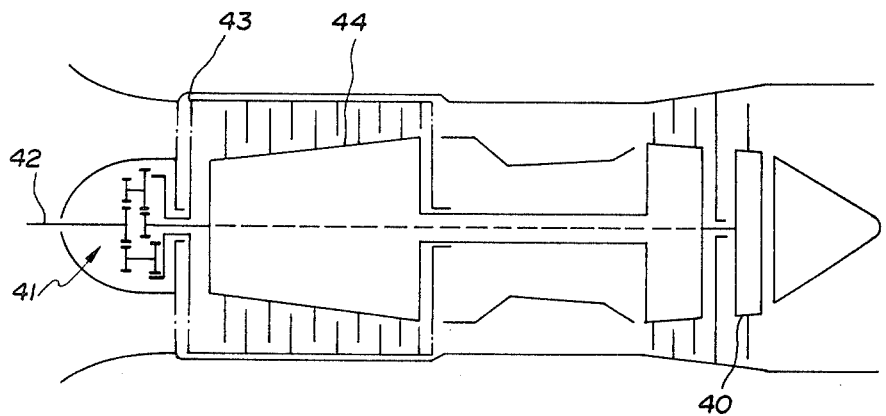

FIG. 4 shows another embodiment for an engine having a counter rotating power turbine 40 and employing layshaft gearing 41 for reducing the speed of the output shaft 42 and allowing rotation of the compressor casing 43. As in all the previous embodiments, the gearing is chosen so that the compressor casing 43 rotates in the same direction as the compressor rotor 44 but at reduced speed.

It will be understood that the present invention is not limited to the particular gearing arrangements illustrated or described which may be replaced by other interconnecting means which allow rotation of the compressor casing in a similar manner. Also, the present invention can be applied to other engine configurations. For example, in an engine having more than one gas generator spool, a rotatable stator casing may be used in combination with one or more compressor rotors, or additional rotatable stator casings can be added and interconnected with separate gear ratios to the output shaft.

The selection of the gearing ratio for the compressor stator casing will depend on a number of factors. Although the torque multiplication increases with higher compressor stator/rotor speed ratios, the absolute speed may be limited by aerodynamic and mechanical considerations such as turbine inlet temperature, compressor efficiency and stability, and rotor stresses.

EXAMPLE

A comparative analysis has been made between a turboshaft engine incorporating the present invention as illustrated schematically in FIG. 3 and a conventional free-power-turbine engine utilizing equivalent components.

The size and configuration of these engines was chosen to be suitable for an off-the-road vehicle application with an installed horsepower of the order of 1000, and with a moderate turbine inlet temperature to avoid the necessity for blade cooling in a potentially dusty environment. The example engine has a single multi-stage axial flow compressor driven at constant speed by a two stage turbine, and a single stage power turbine.

The gearing for the engine of the present invention was chosen to provide a compressor stator casing speed of 20% of the compressor rotor speed at the chosen design conditions.

Figure 5:
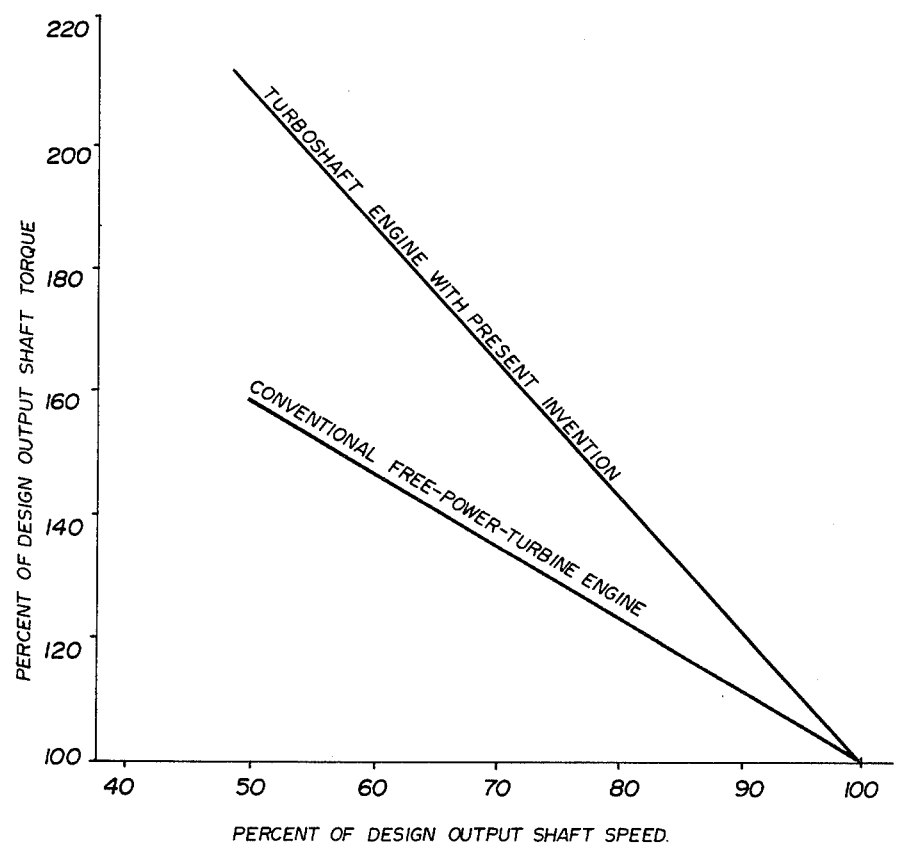
FIG. 5 compares graphically the torque characteristics of a conventional free-power-turbine engine and an engine incorporating the present invention.

FIG. 5 compares the part speed torque of the example engine with that of a conventional free-power-turbine engine. FIG. 5 shows a significantly greater torque amplification for the engine of the present invention. The increased torque magnification indicates the suitability of the present invention to applications requiring high torque at part speed.

We claim:

1. A turboshaft engine comprising a compressor having a rotor and stator casing, a gas generator turbine having a rotor and a fixed stator, a power turbine having a rotor and a fixed stator, and an output shaft connected with the power turbine; said compressor rotor being connected with the gas generator turbine rotor; and said compressor stator casing being rotatably mounted and coaxial with the compressor rotor and interconnected with the output shaft for allowing rotation of the compressor casing in the direction of the compressor rotor at a speed less than that of the compressor rotor and in proportion to the output shaft speed.

* * * * *